(12) United States Patent
Kwiatkowski et al.

(10) Patent No.: US 10,687,652 B1
(45) Date of Patent: Jun. 23, 2020

(54) BEVERAGE BREWER WITH DISPENSE PUMP

(71) Applicant: Food Equipment Technologies, Inc., Lake Zurich, IL (US)

(72) Inventors: Marek K. Kwiatkowski, Round Lake, IL (US); Leszek M. Wroblewski, Lake Forest, IL (US); Gregory Banasik, Arlington Heights, IL (US); Zbigniew G. Lassota, Long Grove, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 715 days.

(21) Appl. No.: 13/706,561

(22) Filed: Dec. 6, 2012

(51) Int. Cl.
*A47J 31/00* (2006.01)

(52) U.S. Cl.
CPC ................... *A47J 31/002* (2013.01)

(58) Field of Classification Search
CPC .. A47J 31/32; A47J 31/34; A47J 31/36; A47J 31/4457; A47J 31/4478; A47J 31/465; A47J 31/52; A47J 31/54; A47J 31/46; A47J 31/002
USPC ......... 99/280, 283, 299, 305, 282, 285, 300, 99/302 R, 307, 315; 426/433
See application file for complete search history.

(56) References Cited

U.S. PATENT DOCUMENTS

| 5,388,501 | A | * | 2/1995 | Hazan | A47J 31/002 99/285 |
| 5,901,636 | A | * | 5/1999 | Witziers | A47J 31/36 99/283 |
| 6,148,717 | A | * | 11/2000 | Lassota | 99/283 |
| 6,522,834 | B1 | * | 2/2003 | Herrick et al. | 392/311 |
| 7,228,066 | B2 | * | 6/2007 | Pope | A47J 31/4475 392/441 |
| 7,337,704 | B2 | * | 3/2008 | Hammad | A47J 31/545 99/281 |
| 7,866,255 | B1 | * | 1/2011 | Wroblewski et al. | 99/315 |
| 2005/0076788 | A1 | * | 4/2005 | Grant | A47J 31/0668 99/279 |
| 2006/0005712 | A1 | * | 1/2006 | Greenwald | A47J 31/56 99/275 |
| 2008/0260927 | A1 | * | 10/2008 | Steenhof | A47J 31/002 426/569 |

(Continued)

*Primary Examiner* — Ibrahime A Abraham
*Assistant Examiner* — Biniam B Asmelash
(74) *Attorney, Agent, or Firm* — James W. Potthast; Potthast & Associates

(57) ABSTRACT

An electric hot beverage brewer (20) with a duty cycle modulated DC voltage dispense pump (44) with an inlet (46) connected to a de-aerator (24) and beneath a lower limit and an outlet (48) located above an upper limit the surface a hot water tank (22) is finely controlled by a high frequency pulse-width, modulated, square power input voltage (FIG. 2) with a duty cycle controlled in accordance with predetermined profiles stored within a controller (28) to selectively change the flow rate out of the pump onto a distribution dome (50) during a dispense period of a brew cycle to achieve optimum brewing of different types of beverage ingredients and varieties of the different types and to selectively change the spray pattern of hot water onto the ingredient (53) within the basket assembly (52) between vertical and acute angles including acute angles that pass hot water into a bypass gap (56).

20 Claims, 5 Drawing Sheets

(56) References Cited

U.S. PATENT DOCUMENTS

2011/0097454 A1* 4/2011 Coccia .................... A47J 31/36
426/231

* cited by examiner

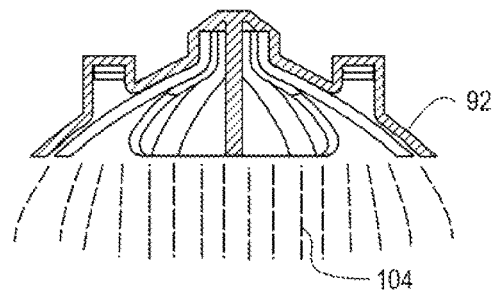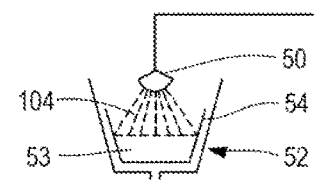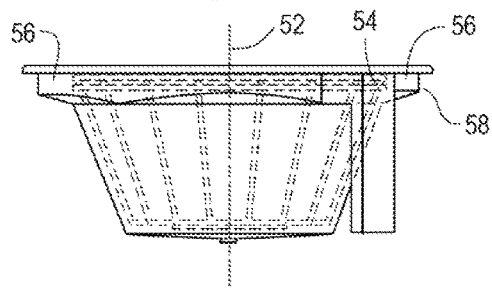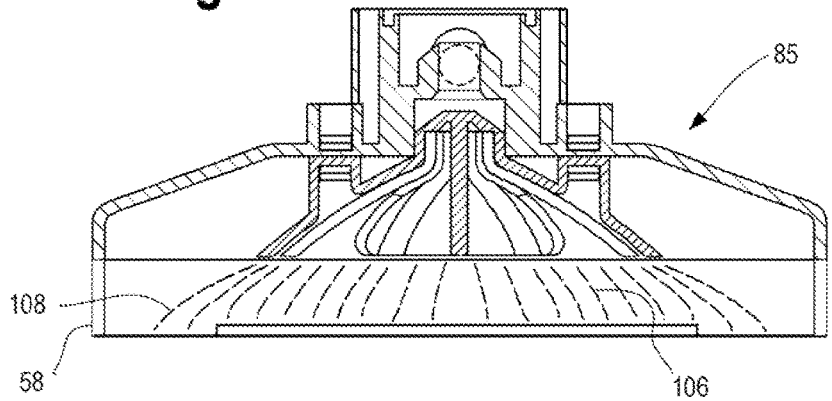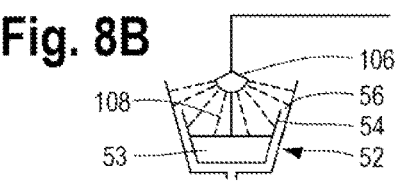

BEVERAGE BREWER WITH DISPENSE PUMP

CROSS-REFERENCE TO RELATED APPLICATION

This application claims the benefit under 35 U.S.C. 119(e) of provisional patent application 61/567,793, filed Dec. 7, 2011, and entitled "Beverage Brewer with Dispense Pump and Method", which is hereby incorporated by reference.

BACKGROUND

Field of the Invention

This invention generally relates to electrical hot beverage brewers and more particularly to electrical, drip-type, hot beverage brewers that operate automatically to pass hot water into a brew basket containing beverage ingredient to be mixed with the hot water to make the beverage.

Discussion of the Prior Art

Electrical hot beverage brewers, such as coffee brewers or tea brewers, of the type that operate automatically to pass a preselected amount of hot water into a brew basket are well known. The brew basket contains dry beverage ingredient, such as ground coffee or tea leaves, which partially dissolves into the hot water to make the freshly brewed beverage.

Commercial drip-type beverage brewers of this type produce between one half gallon to three gallons per brew cycle by distributing hot water near boiling temperature (e.g. 195-203 degrees Fahrenheit), or brew water, on ground coffee or tea leaves supported on a coffee filter which, in turn, is supported by a mesh or otherwise porous filter holder inside a water impervious brew basket body. The brewing water extracts the desired principle from the ingredient to produce the filtered beverage that passes out of a drain hole at the bottom of the brew basket body and into a suitable container, such as an insulated dispenser. Optimal brew time is generally between three and six minutes depending upon whether coffee or tea is being made and further depending upon the different types and varietals of each.

There are several different dispense flow rate control methods. The most basic commercial brewer is a pour over type where water is poured into the brewer and displaces or flows through a hot water tank to be heated and distributed into the brew basket. An orifice plate or other passive mechanical device controls the flow rate through the hot water tank to the spray head. The orifice size is based on the heating rate of the hot water tank and the desired rate of flow over the beverage ingredient.

In another method, a hot water tank is filled by adding in fresh cold water at the bottom of the tank to displace the hot water that is discharged into the brew basket. The inlet water is passed through a solenoid controlled inlet till valve which is opened and kept open for a preselected electronically timed dispense period needed to deliver the desired quantity of brew water. As the cold water enters the tank at the bottom, the hot brew water at the top of the tank flows out of the very top of the hot water tank (where the water is the hottest) through a flow control device and distributed into the brew basket by a suitable spray distribution head.

In a third method, two different solenoid controlled valves are employed. An inlet fill valve fills the tank to a preselected level and maintains the level in response to upper and lower level sensors of the hot water tank, and another solenoid controlled valve, or dispense valve, releases water from the top of the tank through a spray distribution head to the brew basket. The dispense valve most often used is a solenoid controlled dump valve of a fixed size. However, other electromechanically controlled means may be employed in lieu of the single dispense valve, examples of which are shown in U.S. Pat. No. 5,331,885 issued to Zbigniew G. Lassota on Jul. 26, 1994 for an invention entitled "Semiautomatic Beverage Maker and Method and U.S. Pat. No. 5,000,082 issued to Zbigniew G. Lassota on Mar. 19, 1991 for an invention entitled "Beverage Maker and Method of Making a Beverage", both of which are hereby incorporated by reference.

There are three known methods of distributing the brew water into the brew basket which respectively employ a flow disc regulator with spray cutters, a perforated plate and a cascading spray dome. All three methods direct the flow of the brewing water into the brew basket and assist in control and regulation of the flow rate.

The flow disc regulator and spray cutters work together and are matched for the type, quantity and quality of coffee or tea being brewed and the batch size.

The perforated plate, which resembles a shower head or salt shaker top, directs the brewing water into the brew basket in a uniform shower or spray pattern.

A cascading spray dome directs the optimal pattern for a given flow by directing brew water over the outside of an umbrella shaped dome. Upwardly facing channels on the surface of the dome that radially extend to the peripheral edge of the dome direct individual streams of the water into the brew basket. Reference should be made to U.S. Pat. No. 7,866,255 issued to Leszak M. Wroblewski and Zbigniew G. Lassota on Jan. 11, 2011 for an invention entitled "Beverage Brewer with Spray Distribution Assembly and Method", which is hereby incorporated by reference.

It is extremely important for commercial food service beverage, catering, and office coffee service (OCS) brewers to produce a reliable brewed beverage with the desired 3-6 minutes that is consistent in flavor, taste and texture from one brew cycle to the next. Unfortunately, all of the known methods of brewing suffer from the same four liabilities: (1) complexity of design that is difficult and expensive to operate and service, (2) difficulty in varying the brew dispense time periods to accommodate the needs for different types and varieties of beverage ingredient, (3) a need for the presence of a large number of needed components and support systems, and (4) lack of fine control over the spray and flow patterns and flow rates.

Accordingly, there is a need for a new apparatus and method that provides automatic fine and repeatable control of both flow rates and spray distribution patterns in an electric, automatic, drip-type brewer.

SUMMARY OF THE INVENTION

The inventors have determined that even for different brew cycles of the same batch size, it may be desirable to have a high flow rate for some beverage ingredients and a lower flow rate for other beverage ingredients. A finished beverage can have entirely different taste and extracted content characteristics based on the type of exposure to the flow rate and timing of the brew water distributed to the brew basket. It is therefore a general object of the present invention to provide a brewer and brewing method in which the instantaneous non-zero flow rate during the course of a brew cycle and the brew time may be controlled independently.

The inventors have also determined that another important factor that must be controlled for optimum brewing is the spray pattern of the brewing water impacting on the beverage ingredient within the brew basket. Some brewing ingredients require a forceful spray to create turbulence while others brew best with a steady or intermittent shower. The spray may need to be balanced between the outer area near the side wall of the filter paper upon which the ingredient is supported and the center of the brew basket. Brew water spray can be forceful with a reduced flow for a longer duration than a forceful high volume spray for a short time. Thus, it has been ascertained that both the flow rate and pattern of the brewing water distribution into the brew basket directly affects quality of the finished beverage.

It is therefore also a general object of the invention to provide a commercial hot beverage brewer and brewing method in which it is possible to tightly control the flow rate in order to achieve consistent final results from one brewing cycle to the next for the same brewing ingredient. The flow rate and spray pattern may be selectably varied to accommodate for both differences in the type of ingredient (e.g. coffee, tea, etc.) and as well as varieties of the same type of ingredient (e.g. decaffeinated coffee, specialty roast varietals of coffee, etc.) of the beverage being brewed.

It is also therefore an object of the present invention to provide a beverage brewer and method of brewing that achieves the above qualities but also overcomes the aforementioned problems and disadvantages of known brewers.

These objectives are achieved at least in part by providing an electrical beverage brewer having a brew basket for holding beverage ingredient for brewing a beverage, with an unpressurized hot water tank, a water fill system for maintaining water level in the tank between preselected limits, a water dispense system including a variable speed pump for pumping hot water out of the hot water tank, and a spray distribution dome with an upper surface for receiving hot water from the pump, said dome having upwardly facing, open, surface channels to direct the hot water from the pump into individual streams of hot water deposited into the brew basket, a variable electrical power supply connected to the pump, and a controller for controlling the variable electrical power supply to selectively change the application of electrical power to the variable speed pump to selectively vary the rate of hot water flowing out of the pump and onto the dome, during a preselected dispense period, said spray distribution dome creating substantially different spray patterns in response to receiving hot water at different preselected flow rates of the pump.

Preferably, the hot water tank is open to atmosphere, and the pump is a variable speed, flooded suction pump with an inlet located adjacent the top of the tank but beneath a lowest one of the preselected water level limits, and an outlet above a highest one of the preselected water level limits. The hot water tank has a top, and the pump is mounted adjacent to the top of the hot water tank but beneath the upper one of the preselected limits. An outlet tube connecting an outlet of the pump to the spray distribution dome at a location above the top of a highest one of the preselected limits.

The pump is preferably a sealed, brushless, centrifugal impeller type pump suitable for pumping boiling hot water. It has an impeller speed with a corresponding flow rate that varies directly with the electrical power provided to the pump by the variable power supply. The variable electrical power supply produces a variable DC power voltage with a square wave having a duty cycle that is selectively varied to selectively change the average DC power being produced by the variable electrical power supply.

The variable electrical power supply produces a variable DC power voltage with a square wave having a duty cycle that is selectively varied to change the average DC power being produced by the variable electrical power supply. The controller has a stored program with a dispense profile that includes at least one period during which a first duty cycle is selected for a relatively low pump flow rate to cause the streams of water to flow downward from the dome into the brew basket in a relatively vertical direction, and at least one other period during which a second duty cycle greater than the first duty cycle is selected for a relatively high flow rate to cause the streams of water to flow downwardly and outwardly from the dome at an acute angle relative to vertical.

In the preferred embodiment, the brew basket has an outer water impervious protective body with an outer top edge and an inner water pervious filter holder with an upper perimeter spaced from the outer top edge to provide a gap for the passage of bypass water, and the relatively high flow rate causes at least some of the streams of water to flow downwardly and outwardly from the dome at an acute angle and pass through the bypass water gap and miss the filter holder.

The object of the invention is also obtained in part by provision of an electrical beverage brewer, having an unpressurized hot water tank a water fill system for maintaining water level in the tank between preselected limits, a brew basket for holding ingredient to be brewed upon mixing with hot water a water dispense system including a variable speed electrical pump for pumping hot water out of the hot water tank, and a spray distribution head, power controlling means for selectively varying an amount of non-zero electrical power to the pump to selectively vary a non-zero speed of the pump and resultant flow rate of hot water out of the pump, said power controlling means including means for selectively changing a DC power voltage greater than zero provided to the pump to selectively vary a non-zero speed of the pump and resultant non-zero flow rate during operation of the pump.

Acquisition of the object of the invention is also obtained by providing, for use in an electrical beverage brewer with a brew basket for holding beverage ingredient for brewing a beverage, an unpressurized hot water tank, a water fill system for maintaining water level in the tank between preselected limits, a method of brewing by performing the steps of dispensing hot water from the hot water tank with a variable speed pump onto a spray distribution dome with an upper surface for receiving hot water from the pump, said dome having upwardly facing, open, surface channels to direct the hot water from the pump into individual streams of hot water deposited into the brew basket, a variable electrical power supply connected to the pump, controlling a variable electrical power supply connected to the pump to selectively change the application of electrical power to the variable speed pump to selectively vary the flow rate of hot water passing out of the pump and onto the spray distribution dome during a preselected dispense period of a brew cycle, and creating with said spray distribution dome substantially different spray patterns in response to receiving hot water at different preselected flow rates of the pump Obtainment of the invention is also acquired in part by provision, for use in an electrical beverage brewer, a method of brewing by performance of the steps of maintaining water level in a hot water tank between preselected limits with a water fill system, holding ingredient to be brewed upon mixing with hot water in a brew basket, dispensing water into the brew basket with a water dispense system including a variable speed electrical pump for pumping hot water out of the hot water tank, selectively varying with a power controlling means an amount of non-zero electrical power to the pump to selectively vary a non-zero speed of the pump and resultant flow rate of hot water out of the pump, said power controlling selectively changing a DC power voltage greater than zero provided to the pump to selectively vary a non-zero speed of the pump and resultant non-zero flow rate during operation of the pump.

Preferably, the method includes the steps of directing hot water from the pump, with a dome shaped configuration of the spray distribution head, into individual streams of hot water that enter the brew basket in a vertical direction and selectively varying non-vertical directions depending upon flow rate of the pump.

BRIEF DESCRIPTION OF THE DRAWINGS

The foregoing objects features and advantages of the invention will be described and otherwise will be made apparent from the detailed description below that is given with reference to the several figures of the drawings, in which:

FIG. 6A is a schematic illustration of a relatively broad and spray pattern generated by the spray distribution assembly when the dispense pump is operated at a relatively higher DC voltage and corresponding relative higher flow rate;

FIG. 6B is a schematic illustration of the relatively broad spray pattern of FIG. 6A in reference to the brew basket and filter holder within the brew basket;

FIG. 7 is a sectional side view of the brew basket of FIG. 1 illustrating the presence of peripheral bypass gaps to allow water to pass by the brew basket and directly into the dispenser of FIG. 1;

FIG. 8A is a schematic illustration of a relatively broadest spray pattern generated by the spray distribution assembly of FIG. 4 when the dispense pump is operated at a relatively highest DC power voltage and at a corresponding highest flow rate such that some of the spray passes through the bypass gap of FIG. 7;

FIG. 8B is a schematic illustration of the relatively broadest spray pattern of FIG. 8A in reference to the brew basket and bypass gap of FIG. 7;

DETAILED DESCRIPTION

Figure 1:
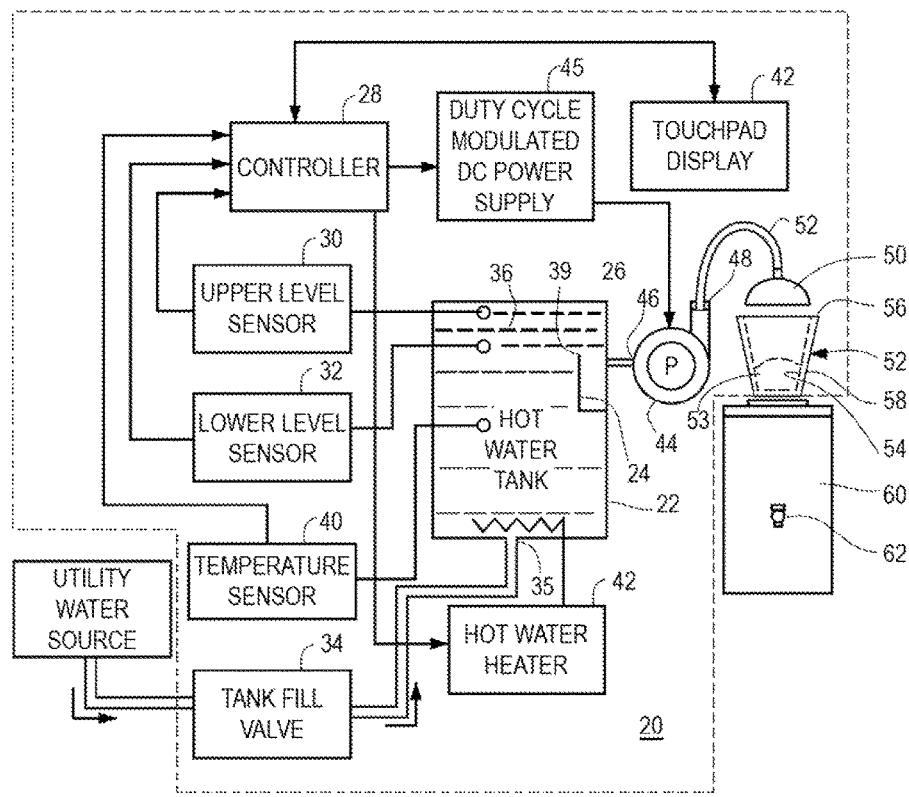
FIG. 1 is a functional block diagram of the beverage brewer of the present invention.

Referring to FIG. 1, a preferred embodiment of the hot beverage brewer 20 of the present invention has a hot water tank 22 with a capacity of approximately 2.5-3.0 or 4.5-5.0 gallons depending upon whether the brewer is a single brewer or a twin brewer, respectively. These quantities within the hot water tank are needed in order to make a typical one gallon or three liter batch during a single brew cycle. Batch size is preferably one gallon but may be one-half to two gallons in half gallon increments.

The hot water tank 22 includes a unique de-aerator 24 mounted to one side of the tank 22 and adjacent to a hollow, tubular fitting 26 to provide open fluid communication between the interior of the tank 22 and the exterior, that will be explained in greater detail below.

A microprocessor controller, or controller, 28 receives input signals from an upper level sensor 30 and a lower level sensor 32 to control a solenoid controlled tank fill valve 34 to selectively open and close to maintain the level 36 of the hot water 38 in the hot water tank 22. Whenever the water level reaches the level of the lower level sensor 32, the controller 28 is alerted to actuate the solenoid controlled tank fill valve 34 to open. When the tank fill valve opens, a suitable pressurized source of unheated water, such as from a utility water source 36, is connected with the bottom of the hot water tank 22, and unheated water enters the bottom of the hot water tank 22. The entry of the unheated water into the bottom of the tank causes the level 36 to rise, and when the level 36 reaches the level of the upper level sensor 30, the controller 28 is alerted to remove power from the solenoid to close the tank fill valve. In this way the level 36 is generally kept between the levels of the upper level sensor 30 and the lower level sensor 32. The difference between the upper and lower levels may be as small a couple of inches. Most importantly, the level 36 is kept above a top edge 38 the de-aerator 24 and the level of the tubular tank outlet fitting 26.

The temperature of the hot water is maintained at a preselected high temperature, i.e. near the boiling point, stored within the controller memory. When a temperature sensor 40 indicates to the controller that the sensed temperature is less than the preselected high temperature, the controller 28 causes an electrical hot water heater 42 to become energized to raise the temperature. When the sensed temperature is again raised above the preselected high temperature, the controller deenergizes the electrical hot water heater, and the temperature is allowed to again decrease either due to the removal of the hottest water from the top or simply due to unavoidable thermodynamic loss out of the top and sides of the tank, despite the tank 22 being insulated. In this way the temperature of the hot water 38 in the tank 22 is kept at approximately the preselected high temperature.

Communication with the controller 28 is preferably by means of a touchpad display 42 which provides displays of information and virtual selection keys. The virtual, or soft, soft keys may be selected merely by a user touching the screen at the location of the key. The microprocessor based controller 28 has a brew parameters memory in which is stored, in addition to other operation data, a plurality of brew profiles for different types of beverage and different varieties of the different types, as well as for different batch sizes for the different profiles. Each profile include the duration of total dispense period, the duration of any wetting period, steeping periods, batch size, duration of a drip period after the end of the dispense period. The profiles also include the duration of intermittent flow pulses of dispense water as well as the number of such pulses and the duration of the gaps between flow pulses of dispense water, if intermittent dispensing is desired. Such pulse brew, or intermittent brew, operation, as well as further explanation of profile parameters are shown in detail in U.S. Pat. No. 6,148,717 issued to Zbigniew G. Lassota on Nov. 21, 2000 for an invention entitled, "Beverage Maker with Intermittent Beverage Liquid Dispenser and Apparatus and Method for Uniform Contact of Brew Ingredient with Brew Water", which is hereby incorporated by reference.

Unlike know brew cycle profiles, in accordance with the present invention the profiles of the present invention include specification of the precise level of the flow rate of dispense water into the brew basket during each split second, such as one tenth second, that dispensing occurs. In addition, the profile specifies gradual increases and decreases of flow rate when the flow rate is transitioning between a preselected maximum flow rate and a zero flow rate, in the split second increments.

In keeping with one advantageous feature of the brewer 20 of the present invention, unlike some known brewers in which a solenoid controlled dispense valve, or brew valve, can only be fully open or fully closed, and average flow rate can only be lowered by employing pulse brewing as noted above, in the present invention an electrical pump 44 replaces the commonly used solenoid controlled solenoid.

More importantly, the electrical pump 44 is a type of pump that is capable of having its flow rate selectively varied in accordance with a finely designed profile with a sub-second resolution without resorting to pulse brew operation, if not desired. For example, the flow rate may simply vary between one relatively low but non-zero flow rate and a relatively higher and non-zero flow rate, without ever a pause during which there is zero flow rate. Such control is not possible with an open or close valve.

If used with pulse brew operation, on the other hand, and much greater level of control is achievable. The use of a finely controlled pump 44 enables pulse brew operation with alternating periods of flow and non-flow with periods of flow at different magnitudes, or flow rates, from one brew cycle to the next or during a single dispense period of a single brew cycle. Also, as noted, a type of pulse brew can be provided in which the flow rate is never zero but fluctuates in pulse like manner between low and high flow rates which may also vary during a single dispense period. As will be explained in greater detail below, this ability to finely control the flow rate of hot water being provided to a distribution head enables selective changes to the spray pattern of hot water impinging upon the top surface of the beverage ingredient within the brew basket.

The inventors have determined that repeatability of the actual desired flow profile as measured during repetitive brew cycles using the same profile is enhanced by insuring that the electric pump flow rate is independent of hot water head level fluctuations within the hot water tank 22. This is achieved by mounting the hot water outlet 26 adjacent the but slightly beneath the lowest level of water in the hot water tank near the top of the hot water tank 22. The variation in head pressure is then no greater than the difference between the highest level and the lowest level, which may be separated by as little as two inches. The outlet fitting is connected to an input port of the pump 44 by means of a flexible tube 46.

Figure 3:
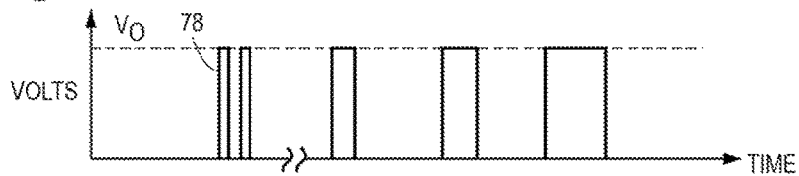
FIG. 3 is an exemplary schematic chart of the varying duty cycle of the DC voltage provided to the pump that gradually increases during gradual increases of the average DC voltage provided to the pump and the corresponding resultant gradually increased flow rate, as illustrated in FIG. 6.

Moreover, enhanced control resolution is achieved by use of a power supply 45 for the pump 44 that generates a duty cycle modulated, square wave, DC power voltage at a frequency of approximately three hundred Hertz. This DC power voltage is a square wave DC signal of fixed amplitude, such as twelve volts DC, but with a duty cycle that may be selectively varied, as shown in FIG. 3, with a digital control signal from the controller 28 to selectively, and finely change the duty cycle and thus the average output voltage.

Preferably, the pump 44 is a sealed, brushless, centrifugal, impeller-type DC pump 44 equipped to pump near boiling hot water, the pump which operates with a flow rate that that is controllable between zero flow rate and a maximum flow rate of not less than 1.5 L/min. by varying the DC power voltage between approximately six volts DC and twelve volts DC. Importantly, the pump is capable of very fine flow rate control through control of the duty cycle of the pulsed, DC power voltage provided to the pump 44 to modulate the flow rate multiple times at a sub-60 Hz rate, such as approximately 300 Hz.

Lowering the duty cycle of the pulsed DC power voltage over a period with a number of pulses lowers the average DC voltage during that period. On the other hand, increasing the duty cycle of the pulsed DC power voltage over a period with number of pulses raises the average DC voltage during the period of increased duty cycle. The duty cycle may be increased or decreased gradually or rapidly to gradually or rapidly increase or decrease the average DC power voltage being supplied to the pump. Each different average DC power voltage level is associated with a corresponding flow rate of the electrical pump between zero and any flow rate greater than zero and less than the maximum An inlet connector 46 of the pump is directly connected with the open tank outlet connector 26 by means of a tubular connector, and an outlet 48 of the pump is directly connected to a spray distribution head 50, via a fully open flexible tube 52. Importantly, the tank outlet connector 26 is located beneath the preselected lower level limit associated with the lower level sensor, and is thus always beneath the level 36 of the hot water 38, as is the pump 44. Accordingly, the pump inlet 46 is always flooded with hot water even when the pump 44 is not pumping.

Accordingly, the pump 44 in this preferred configuration is referred to as a "flooded suction pump". Because of the flooded suction the amount of power required to move a given amount of water is reduced compared to other configurations and the presence of air in the pumped water 38 is reduced. Further reducing the presence of air in the hot water being pumped is the de-aerator 24, noted above. The de-aerator 24 is defined by a box with an open top but closed bottom and side walls that terminate at a sharp top edge 39 of the open top. The outer wall of the de-aerator 24 may comprise a section of the outer wall of the tank 22, although a separate outer wall could be provided. The tank outlet connector 26 is connected to this wall section at a level beneath the sharp top edge 39 of the de-aerator. Thus, all the hot water 38 is pumped from out of the interior of the box defined by the de-aerator 24. As the water is pumped from the box, water from outside of the box but within the hot water tank 22 flows over the top sharp edge 39 and into the interior of the box. As the water 38 flows over the sharp top edge 39, air bubbles in the water are scraped, broken or otherwise penetrated by the sharp edge 39 and released to atmosphere.

Accordingly, air bubbles are advantageously excluded from the water entering an inlet 46 of the pump 44 flow through the pump 44 to prevent cavitations. If the air bubbles are not excluded, they will displace the water in the outflow and thereby reduce the actual outlet flow rate of the water for a given pump speed. In such case, the actual flow rate of the water for a given pump speed varies depending upon how much air is in the flow. The water flow rate this becomes indeterminate. Accordingly, the flow rate for the same profile may result in different actual flow rates depending upon the amount of air bubbles present. In such case, actual flow rate of the water alone cannot be reliably reproduced, or repeated, from one brew cycle to the next even though the brew profile and corresponding pump input voltage profile remains the same.

The water from the spray head 50 is dispensed into a brew basket assembly 52 to percolate through beverage ingredient 53 supported on a filter paper supported by a wire mesh, or otherwise water permeable, filter holder 54. The filter holder has a gap 56 between an outer brew basket body 58 at the top of the brew basket body 58 through which bypass water may be allowed to pass by the beverage ingredient within the filter holder 54 and but down the interior sides of the brew basket 52 and out the brew basket drain hole. After mixing with the ingredient to form the desired beverage, the beverage passes out of the brew basket assembly 52 and into a suitable container, such as an insulated dispenser 60 with a dispense faucet 62 for serving the beverage.

The flow rate may be continuous throughout the dispense period during which time the level of the flow rate may be selectively changed between near zero and the maximum flow rate. For example, the flow rate may be at a relatively low level at the beginning of a dispense period, at an intermediate level during the middle portion and then at a maximum level at the end of the dispense cycle. Any pattern of variations in flow rate during the dispense period may be stored in the controller 28 and then selected by an operator for a particular type or variety of beverage ingredient. By increasing or decreasing the average flow rate while keeping the dispense period constant, the batch quantity may be increased or decreased, respectively. Alternatively, the batch quantity may be kept constant, even though the dispense time period is increased or decreased, by respectively proportionately decreasing or increasing the average flow rate.

Figure 2:
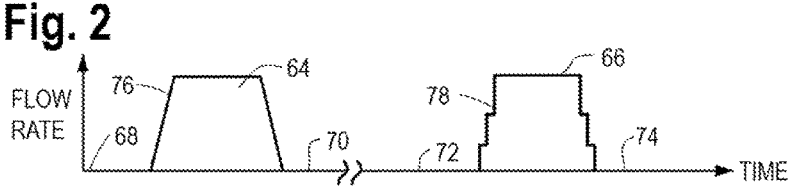
FIG. 2 is an exemplary schematic chart of the changing flow rate over time during intermittent, or pulse brew, operation in which the controlled flow rate is gradually increased and decreased at the beginnings and ends of each of the pulses of flow.

In the case of pulse brew operation, the high degree of control provided by the pump 44 with duty cycle control being used in lieu of a solenoid controlled dispense valve, or dump valve (as described in U.S. Pat. No. 6,148,717 issued Nov. 21, 2000 for an invention entitled "Beverage Maker with Intermittent Beverage Liquid Dispenser and Method for Uniform Contact of Brew Ingredient with Brew"), the degree of control over flow rates, batch size and dispense period duration is further enhanced. In such case, the dispense profile provides for intermittent rather than continuous dispensing during the dispense period, such as shown in FIG. 2, there are periods, each of approximately ten seconds duration, during which dispense water is passed to the brew basket, as indicated by pulses 64 and 66 separated by periods of no flow, also each of approximately ten seconds in duration, such as periods 68, 70, 72 and 74, during which there is no flow.

Unlike a solenoid controlled valve which is either fully closed with a fixed maximum flow rate dependent upon the head level of the water in the hot water tank, or is fully closed with no flow, with the beverage brewer 20 of present invention it is possible selectively change the maximum flow rate of each of the pulses of high flow rate, if desired, and to also, if desired, to provide for a relatively lower but non-zero flow rate between pulse of relatively low flow rate.

As illustrated by the continuous increasing ramp 76, during the start of a pulse of flow, the average voltage applied to the pump 44 is preferably increased gradually to reduce wear and tear on the motor 44 due to rapid and large increases from zero or other relatively low voltage to a maximum or relatively higher voltage. Alternatively, the power input voltage is gradually increased with a stepped increasing ramp 78 with three or more small jumps in voltage. For similar reasons, abrupt stops of the pump are prevented by providing either a continuous decreasing DC power voltage ramp 80 or a stepped decreasing ramp 82 at the end of a relatively period of relatively high input DC power voltage.

Referring to FIG. 3, the flow rate of the pump 44 varies directly with the pulse width, or duty cycle, of the DC power voltage that is provided to the pump 44. When the pulse width and duty cycle of each of a series of DC power voltage pulses generated by the duty cycle modulated DC power supply 45 is relatively low over a period of time, such as pulse 78, the series of such pulses provides a relatively low average DC voltage over that period of time. For instance, if the duty cycle is fifty percent, and the fixed maximum voltage level Vo is twelve volts DC, the average DC voltage over a plurality of cycles will be fifty percent of twelve volts, or six volts. Series of pulses of greater width, such as pulses 80, 82, and 84, with greater duty cycles will provide larger average voltages proportional to the duty cycle. Depending upon the electromechanical characteristics of the pump, a minimum duty cycle of greater than zero may result in zero flow of the pump while a maximum flow rate will always generally result from pulses having a one hundred percent duty cycle. The exact relationship of duty cycle percentage and corresponding flow rate between zero duty cycle and one hundred percent duty cycle is not necessarily linear and should be determined empirically.

Figure 4:
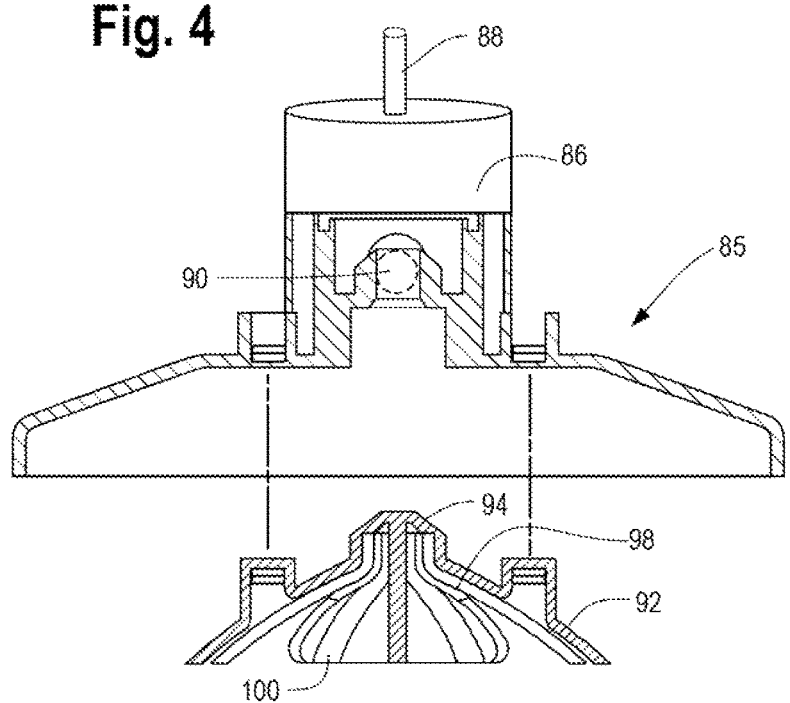
FIG. 4 is an exploded sectional view of the preferred spray head for use with the beverage brewer of FIG. 3.

In addition to being capable of precise control of flow rates and dispense times, it is possible during the dispense time period to selectively control the flow rate to achieve different spray patterns onto the beverage ingredient within the brew basket. This is preferably achieved though use of a spray distribution head assembly 85, such as shown in FIG. 4. Reference should be made to U.S. Pat. No. 7,866,255 issued to Wroblewski, hereby incorporated by reference, for a detailed description of the spray distribution head assembly 85, which is hereby incorporated by reference. Briefly, the distribution head has an inlet cover with a vertical inlet coupler 86 connected through a flexible tube 88. Dispense water from the tube 88 passes through a vertical passageway 90 onto the peak 94 of an umbrella-like distribution plate 92. The water passes from the peak 94 though closed channels into open, upwardly facing, water distribution channels 98 and 100 formed in the top of the distribution plate distribution plate 92. Because the channels are open, very little back pressure is built up and the spray distribution pattern can be substantially affected by the flow rate of water entering the inlet coupler. While the spray distribution head assembly 85 is preferred, it should be appreciated that there may be other types of spray distribution heads with flow rate dependent spray distribution patterns.

The selected average flow rate is one-half to one-and-one-half gallons per minute for producing either one-half gallon or three liters of beverage during a single brew cycle. When producing a batch of three gallons during a brew cycle, instead of only one one-half gallon, the average flow rate is increased proportionately to approximately two to three-and-one-half gallons per minute. It should be appreciated that with pumps of different capacities different flow rates may be obtainable.

Figure 5A:
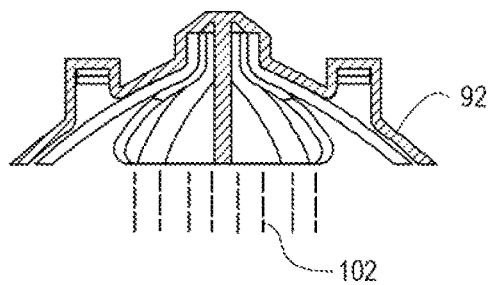
FIG. 5A is a schematic illustration of a relatively narrow and vertical spray pattern generated by the spray distribution assembly when the dispense pump is operated at a relatively lower DC voltage and corresponding relatively lower flow rate.
Figure 5B:
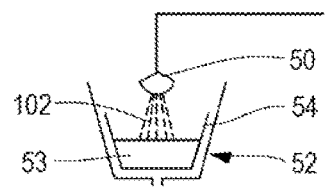
FIG. 5B is a schematic illustration of the relatively narrow and vertical spray pattern of FIG. 5A in reference to the brew basket and filter holder within the brew basket.

In accordance with the present invention, the variation in flow rate of dispense water is used to selectively change the distribution spray patterns of water onto the top surface of the beverage ingredient 53 within the brew basket assembly 52. Referring to FIGS. 5A and 5B, when the flow rate is relatively low, such as approximately one-half, the spray distribution pattern 102 is generally vertical. Referring to FIGS. 6A and 6B, when the flow rate is relatively greater, such as one to one and one-half gallons/minute, then the spray distribution pattern 104 has a component that extends radially outwardly from the vertical at an acute angle.

Achieving another object of the invention, the need for a separate bypass valve or motor may be eliminated by provision of a brew basket assembly 52 like that of FIG. 7. Brew basket assembly 52 has one or more upwardly facing bypass gaps 56 between the brew basket outer housing 58 and the filter holder 54 The bypass gaps 56 are present at the upwardly facing top of the brew basket outer housing 58 for receipt of dispense water from the spray distribution head 85. In such case, referring to FIGS. 8A and 8B, when the flow rate is increased to two gallons per minute to two-and-one-half gallons per minute, then the spray distribution pattern has a component that extends radially outwardly by a sufficient amount to be received against the inside surface of the outer brew basket body 58 and into the bypass gap 56. Once passing through the bypass gap 56, the water moves past the ingredient and directly into the dispenser 60.

Figure 9:
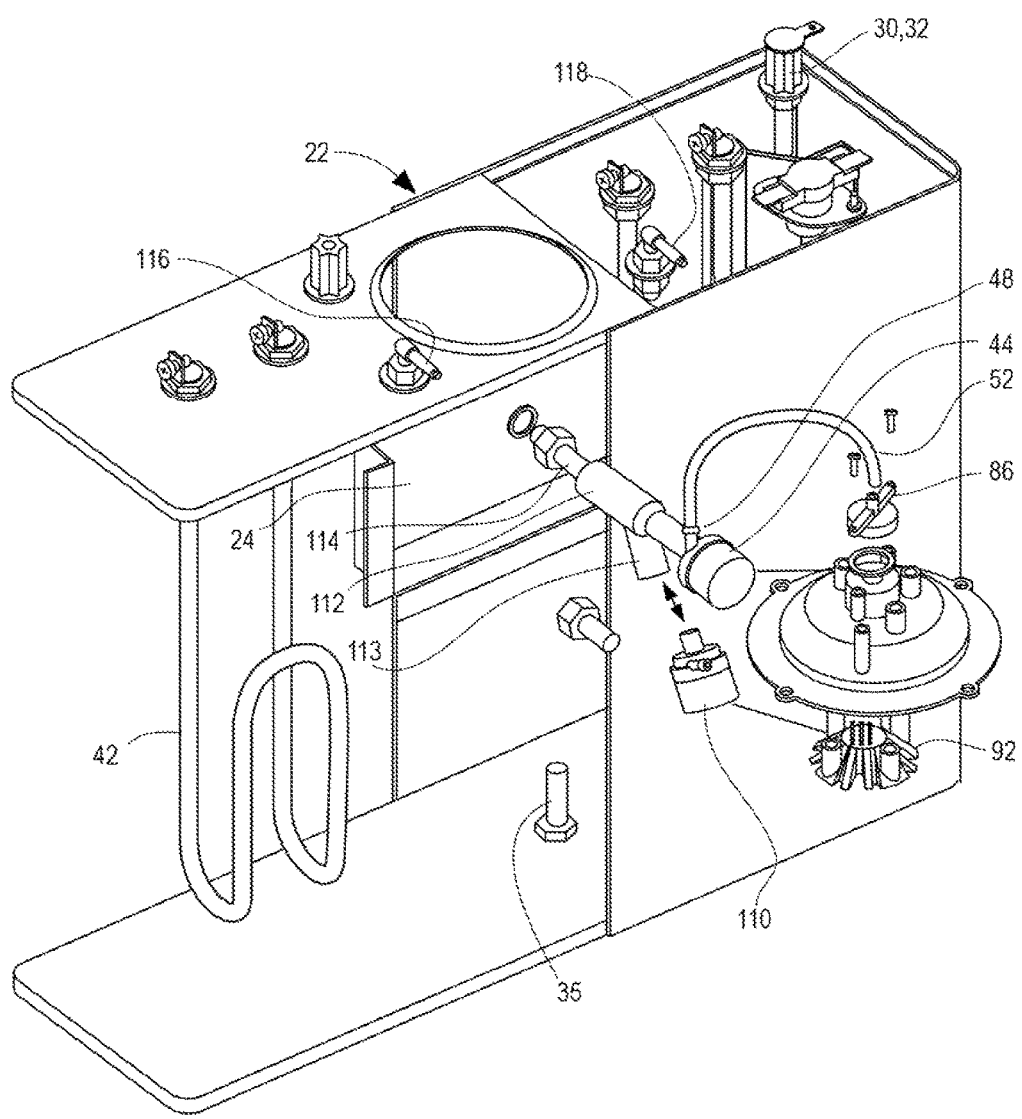
FIG. 9 is a detailed perspective exploded illustration of one embodiment of the tank and its connections with the pump and spray distribution head and also including an optional second pump, or bypass pump, provided solely for pumping a selected amount of bypass water into a bypass gap between the outer body of the brew basket and the filter and ingredient holder.
Figure 10:
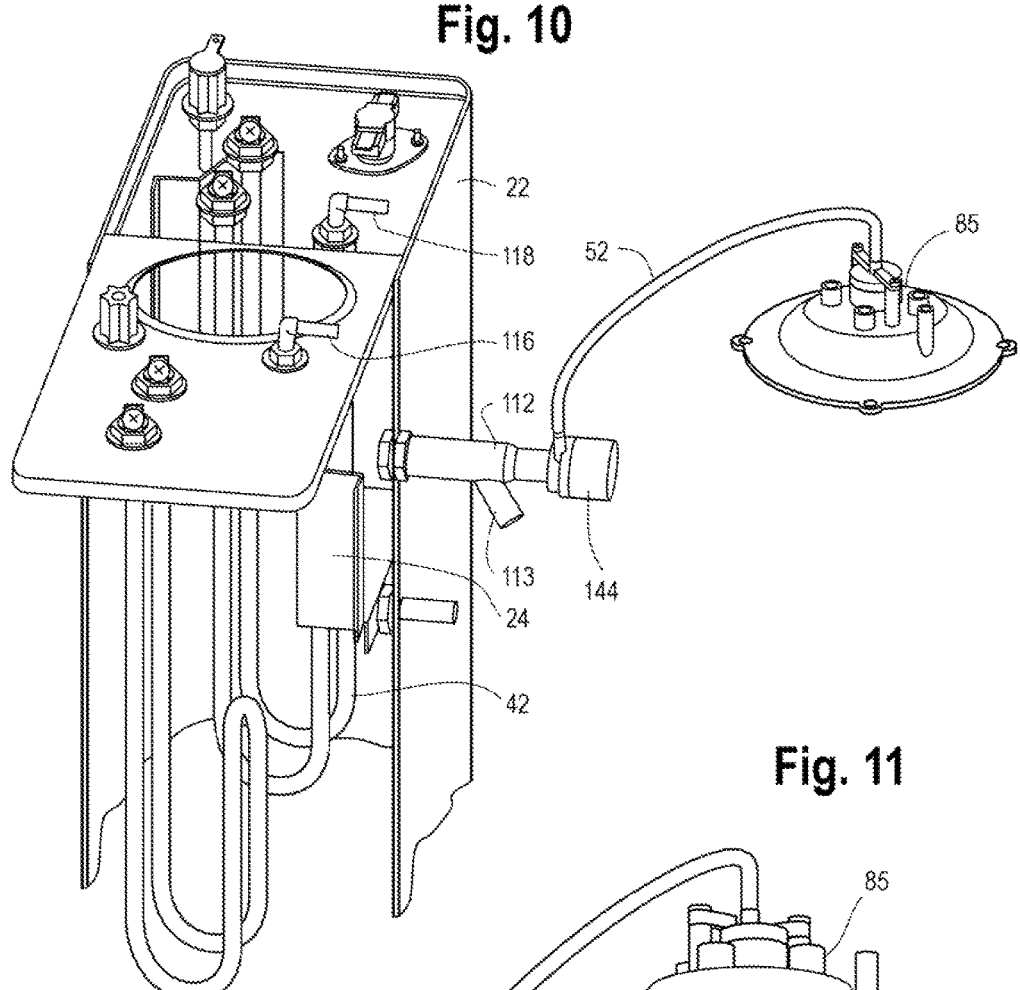
FIG. 10 is a another perspective view of a portion of the tank, pump and spray distribution head of FIG. 9 but with the pump and spray distribution head in an interconnected state.
Figure 11:
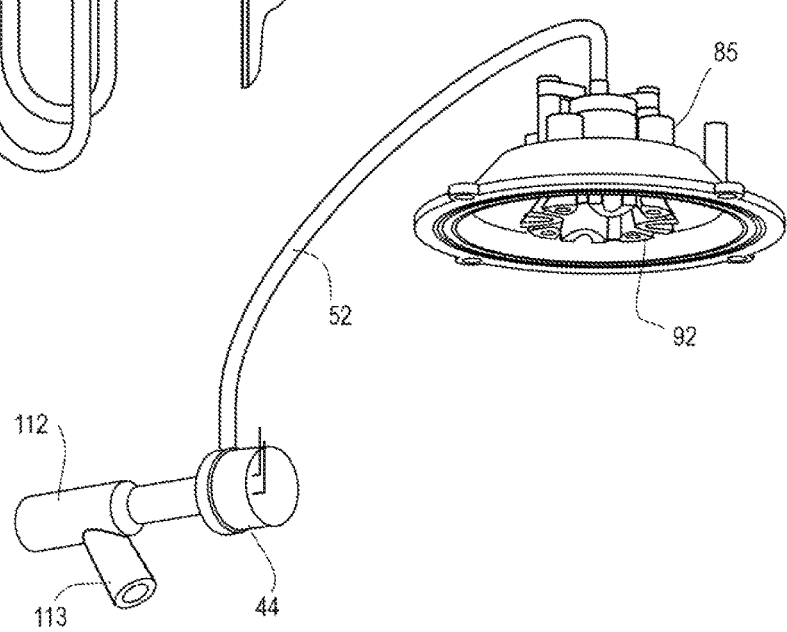
FIG. 11 is another perspective isolated view similar to that of FIG. 10 but enlarged to better illustrate the connection tubing between the pump and the motor and between the pump and spray distribution head.

Referring now to FIGS. 9-11, a detailed perspective exploded illustration of a preferred embodiment is shown together with the connection with the pump 44 and spray distribution head 50. In addition, in this embodiment, an optional second pump, or bypass pump 110 is provided solely for pumping a selected amount of bypass water into the bypass gap 56. As seen in FIG. 9, the hot water tank 22 has a silicon Y-connector 112 for connecting both primary pump 44 and bypass pump 110 to a brew water fitting 114. The bypass pump 110 is connected via a leg 113 of the Y-connector 112. A another fitting may also be provided on the side of the hot water tank 22 for connection to a hot water faucet. Tank vents 116 and 118 are provided at the top the tank 22 above the de-aerator 24 to vent the tank to atmosphere. A pump tube adapter 86 converts a standard solenoid operated spray distribution system into a pump operated version of the present invention. The spray dome 92 is removable from the upper connection with the core beneath the upper cover 85 of the distribution system.

While a particular embodiment has been shown in detail, it should be appreciated that many obvious variations and alterations may be made without departing from the spirit of the invention and the scope of the appended claims.

The invention claimed is:

1. An electrical beverage brewer with a brew basket for holding beverage ingredient for brewing a beverage, comprising:
    an unpressurized hot water tank with a bottom and a top;
    a water fill system configured for maintaining water level in the tank between preselected upper and lower limits during a preselected dispense period of a brew cycle, including
        a tank fill valve connectable to a utility water source and the tank,
        an upper level sensor adjacent to the upper limit, and
        a lower level sensor adjacent to the lower limit, and adjacent to the lower level sensor, the upper level sensor and the top of the hot water tank, to control the tank fill valve to selectively open and close to maintain a substantially uniform head pressure in the tank;
    a water dispense system including
        an electrically controllable variable speed pump for pumping hot water out of the hot water tank at different preselected flow rates, and
        a spray distribution dome with an upper surface for receiving hot water from the pump, said dome having upwardly facing, open, surface channels to direct the hot water from the pump into individual streams of hot water deposited into the brew basket,
        a variable electrical power supply connected to the pump, and
        a controller with a program configured for controlling the variable electrical power supply to selectively vary the flow rate of hot water flowing out of the pump and onto the dome, during the preselected dispense period, said spray distribution dome creating substantially different spray patterns in response to receiving hot water at different preselected flow rates of the pump during the preselected period, said stored program having a dispense profile that includes at least one period during which a first duty cycle is selected for a low pump flow rate to cause the streams of water to flow downward from the dome into the brew basket in a vertical direction, and a least one other period during which a second duty cycle greater than the first duty cycle is selected for a high flow rate to cause the streams of water to flow downwardly from the dome at an acute angle relative to the vertical direction.

2. The beverage brewer of claim 1 in which
    the hot water tank is open to atmosphere, and
        the pump is a variable speed, flooded suction pump with
            an inlet located beneath the lower one of the preselected water level limits, and
            an outlet above the higher one of the preselected water level limits.

3. The beverage brewer of claim 1 in which the hot water tank has a deaerator located adjacent the inlet to remove air from water entering the pump.

4. The beverage brewer of claim 1 in which the hot water tank has a top, and the pump has an inlet tube connected to the tank at a location adjacent the top but beneath a lowest one of the preselected limits.

5. The beverage brewer of claim 1 including an outlet tube connecting an outlet of the pump to the spray distribution dome at a location above the top of the upper one of the preselected water level limits.

6. The beverage brewer of claim 1 in which the pump is a sealed, brushless, centrifugal impeller type pump suitable for pumping boiling hot water.

7. The beverage brewer of claim 1 in which the pump has an impeller speed with a corresponding flow rate that varies directly with the average electrical DC power voltage provided to the pump by the variable power supply.

8. The beverage brewer of claim 1 in which
the controller has a plurality of brew dispense profiles, and
the variable electrical power supply produces a variable DC power voltage with a square wave DC output voltage having a duty cycle that is selectively varied in accordance with the profiles to selectively change the average DC power being provided to the variable speed pump during a dispense period.

9. The beverage brewer of claim 8 in which the frequency of the DC output voltage square wave has a sub-second period to enable sub-second adjustments to the flow rate of the variable speed pump.

10. The beverage brewer of claim 9 in which
the variable speed pump has a recommended, maximum operating, average input power voltage, and
the power supply produces the recommended maximum when operated to produce an output power voltage square wave with a duty cycle of approximately one hundred percent.

11. The beverage brewer of claim 1 in which the variable power supply produces a square wave output voltage with a frequency of approximately 300 Hz.

12. The beverage brewer of claim 1 in which the controller use the stored program with the dispense profile to cause the duty cycle to gradually increase to increase the average DC power voltage from a lower voltage to a substantially higher voltage during at least a part of a dispense period.

13. The beverage brewer of claim 1 in which the controller use the stored program with the dispense profile to cause the duty cycle to gradually decrease when the DC power voltage is decreased from a higher voltage to a substantially lower voltage during at least a part of a dispense period.

14. The beverage brewer of claim 1 in which the controller use the stored program with the dispense profile to cause a plurality of intermittent alternate periods of pumping when the duty cycle is at one level and non-pumping when the duty cycle is at another level lower than the one level during at least part of a dispense period.

15. The beverage brewer of claim 1 in which the controller use the stored program with the dispense profile to cause a plurality of intermittent alternate periods when the duty cycle is at a preselected non-zero value associated with a period of pumping and when the duty cycle is at another value less than the preselected non-zero value associated with a period of non-pumping, the duty cycle to gradually increase from the other value to the preselected nonzero value to gradually begin a period of pumping, and the duty cycle to gradually decrease from the preselected nonzero value to the other value gradually stop a period pumping.

16. The beverage brewer of claim 1 in which
the variable electrical power supply produces a variable DC power voltage with a square wave having a duty cycle that is selectively varied to change the average DC power being produced by the variable electrical power supply, the controller use the stored program with the dispense profile that includes at least one period during which a first duty cycle is selected for a relatively low pump flow rate to cause the streams of water to flow downward from the dome into the brew basket in a relatively vertical direction, and
at least one other period during which a second duty cycle greater than the first duty cycle is selected for a relatively high flow rate to cause the streams of water to flow downwardly and outwardly from the dome at an acute angle relative to vertical.

17. The beverage brewer of claim 16 in which
the brew basket has an outer water impervious protective body with an outer top edge and an inner water pervious filter holder with an upper perimeter spaced from the outer top edge to provide a gap for the passage of bypass water, and
the relatively high flow rate causes at least some of the streams of water to flow downwardly and outwardly from the dome at an acute angle and pass through the bypass water gap and miss the filter holder.

18. An electrical beverage brewer, comprising:
an unpressurized hot water tank a water fill system configured for maintaining water level in the tank between preselected limits;
a brew basket for holding ingredient to be brewed upon mixing with hot water;
a tank fill system including
a tank fill valve connectable to a utility water source and the tank,
an upper level sensor and a lower level sensor configured to control the tank fill valve to selectively open and close to maintain the water level in the tank, the upper and lower level sensors being adjacent to one another and to the top of the tank
a water dispense system including
a variable speed electrical pump for pumping hot water out of the hot water tank, spray distribution head, and
a power controlling means with a stored program configured for selectively varying an amount of non-zero electrical power to the pump to selectively vary a non-zero speed of the pump and resultant flow rate of hot water out of the pump and to the spray distribution head, said power controlling means including means for selectively changing a DC power voltage greater than zero provided to the pump to selectively vary a non-zero speed of the pump and resultant non-zero flow rate during operation of the pump to cause at least a few different variations of the nonzero speed of the pump resulting in at least a few corresponding plural variations of a spray pattern created by the combination of the spray distribution head and the changing DC power voltage provided to the pump during a single brew cycle, said stored program having a dispense profile that includes at least one period during a first DC power voltage is selected for a relatively low pump flow rate to cause the streams of water to flow downwardly from the dome into the brew basket in a substantially vertical direction, and at least one other period during which a second DC power voltage greater than the first duty DC power voltage selected for a high flow rate to cause the streams to flow downwardly and outwardly from the dome at an acute angle relative to the vertical direction.

19. The electrical beverage brewer of claim 18 in which the power controlling means includes a microprocessor controller using the stored profile, the stored profile having at least a few plural variations of the power changes during a preselected dispense period, and a DC voltage supply responsive to the controller to change the DC voltage in accordance with the stored profile.

20. The electrical beverage brewer of claim 19 in which the spray distribution head has a dome shaped configuration that directs hot water from the pump into individual streams of hot water that enter the brew basket in a vertical direction and varying non-vertical directions depending upon flow rate of the pump.

\* \* \* \* \*